US 9,902,862 B2

(12) United States Patent
Hsu et al.

(10) Patent No.: US 9,902,862 B2
(45) Date of Patent: Feb. 27, 2018

(54) METHOD OF FABRICATING NANO-SILVER PASTE HAVING HIGH BONDING STRENGTH

(71) Applicant: National Cheng Kung University, Tainan (TW)

(72) Inventors: Steve Lien-Chung Hsu, Tainan (TW); Yen-Ting Chen, Tainan (TW); In-Gann Chen, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 6 days.

(21) Appl. No.: 15/203,029

(22) Filed: Jul. 6, 2016

(65) Prior Publication Data

US 2018/0009998 A1 Jan. 11, 2018

(51) Int. Cl.
*H01B 1/22* (2006.01)
*C09D 5/24* (2006.01)
*C09D 7/12* (2006.01)
*B05D 1/28* (2006.01)

(52) U.S. Cl.
CPC .............. *C09D 5/24* (2013.01); *B05D 1/28* (2013.01); *C09D 7/1241* (2013.01); *H01B 1/22* (2013.01)

(58) Field of Classification Search
CPC ... H01B 1/00; H01B 1/02; H01B 1/22; B05D 5/00; B05D 5/12; C01G 5/00
See application file for complete search history.

(56) References Cited

U.S. PATENT DOCUMENTS

| 5,882,722 A * | 3/1999 | Kydd | H01B 1/02 257/E23.075 |
| 8,597,397 B2 * | 12/2013 | Kunze | B22F 1/0022 75/362 |
| 9,283,618 B2 * | 3/2016 | Wu | B22F 1/0022 |
| 2006/0261316 A1 * | 11/2006 | Jun | C09D 11/30 252/500 |

OTHER PUBLICATIONS

Sileikaite et al "Analysis of silver nanoparticles . . . ", Materials Science (Medziagotyra) vol. 12, No. 4, 2006, 287-91. (Year: 2006).*

* cited by examiner

*Primary Examiner* — Mark Kopec
(74) *Attorney, Agent, or Firm* — Jackson IPG PLLC (57) ABSTRACT

A method is provided to make a nano-silver paste. An organic acid is used as a protective agent. Silver nitrate is used as a source of silver ions to reduce silver nanoparticles on a surface protected by the organic acid. The particle size of the silver nanoparticle is 45 nanometers. In the other hand, a silver precursor of organic metal is synthesized. The organic metal is cracked at 200 celsius degrees (° C.) to fill pores left during sintering. After mixing the silver nanoparticle, the silver precursor and the solvent, the nano-silver paste is obtained. After being heated at 250° C. for 30 minutes, the nano-silver paste has a resistance of $(3.09\pm0.61)\times10^{-5}$ Ω·cm. By being heated at 250° C. and applied with a pressure of 10 MPa to be hot-pressed for 30 minutes for joining copper to copper, the nano-silver paste obtains a bonding strength reaching 36 MPa.

7 Claims, 8 Drawing Sheets

METHOD OF FABRICATING NANO-SILVER PASTE HAVING HIGH BONDING STRENGTH

TECHNICAL FIELD OF THE INVENTION

The present invention relates to fabricating a nano-silver paste; more particularly, relates to adding a silver precursor for significantly enhancing the bonding strength of the nano-silver paste.

DESCRIPTION OF THE RELATED ARTS

For pursuing operation speed, the increase in density of transistors in a device is necessary. Currently, line width of electronic component is already reaching physical limit. For increasing the density of transistors, a concept of a three-dimensional integrated circuit package is proposed. For integrating different functional chips, the chips have to be connected, where the junctions are especially important.

An adhesive used for junction can be a tin-lead solder, a lead-free solder or a silver paste. The silver paste has conductivity and intensity superior to the other two. As being a metal having the highest conductivity, the silver paste can be chosen as the adhesive for not only reducing current consumption but also reducing heat caused by resistance. The higher intensity of the silver paste also allows components to pass a harsher environment without damage. By using a dispensing technology, the silver paste can be formed into a junction having a diameter as small as 10 microns. As being compared to a solder ball having a diameter of 100 microns, the nano-silver paste has greater potential in the field of micro electro-mechanical systems (MEMS) and is currently widely used micro-junctions and in printed circuit.

By nanoscaling, surface energy is enhanced to form many unique nanomaterial characteristics, where lowered melting point is one of them. As the melting point of silver nanoparticles drastically reduces during the nanoscaling process, the silver nanoparticles can be sintered at a low temperature to form a dense sintered bulk for reducing the surface energy. With this characteristic, the silver nanoparticles are made into a nano-silver paste for junction. Regarding an adhesive for micro-junctions, conductivity and bonding strength are important indicators. However, at present, most of the commercially available silver paste on the market refers to conductivity only. Their intensity for joining copper to copper is not high, or an additional resin needs to be added for increasing intensity.

Hence, the prior arts do not fulfill all users' requests on actual use.

SUMMARY OF THE INVENTION

The main purpose of the present invention is to fabricate a nano-silver paste with a silver precursor added for significantly enhancing the bonding strength of the nano-silver paste.

Another purpose of the present invention is to hot-press the nano-silver paste at 250 celsius degrees (° C.) for cracking organic components contained inside with pure silver left.

Another purpose of the present invention is to obtain a resistance of $(3.09\pm0.61)\times10^{-5}$ $\Omega\cdot cm$ with the nano-silver paste formed after being heated at 250° C. for 30 minutes (min), where, after being hot-pressed under 10 MPa at 250° C. for 30 min, the nano-silver paste obtains a copper/silver/copper structure having a junction intensity of 36 MPa.

Another purpose of the present invention to obtain intensity of an interface of copper/silver in the nano-silver paste formed after being hot-pressed as becoming even higher than that of the nano-silver paste itself.

To achieve the above purposes, the present invention is a method of fabricating a nano-silver paste, comprising steps of (a) obtaining silver nanoparticles, where silver nitrate is used as a silver ion source to reduce the silver nanoparticles through a chemical reduction while an organic acid is used as a protective agent to protect a surface of the silver nanoparticles; (b) obtaining a silver precursor, where a 2-ethylhexanoic acid is dissolved in methyl alcohol to be added with a solution of sodium hydroxide to obtain a mixed solution and a solution of silver nitrate is added to the mixed solution to obtain the silver precursor of organic metal; and (c) obtaining a nano-silver paste, where the silver nanoparticles, the silver precursor and a solvent are mixed to obtain the nano-silver paste. Accordingly, a novel method of fabricating a nano-silver paste is obtained.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

The following description of the preferred embodiment is provided to understand the features and the structures of the present invention.

Figure 1:
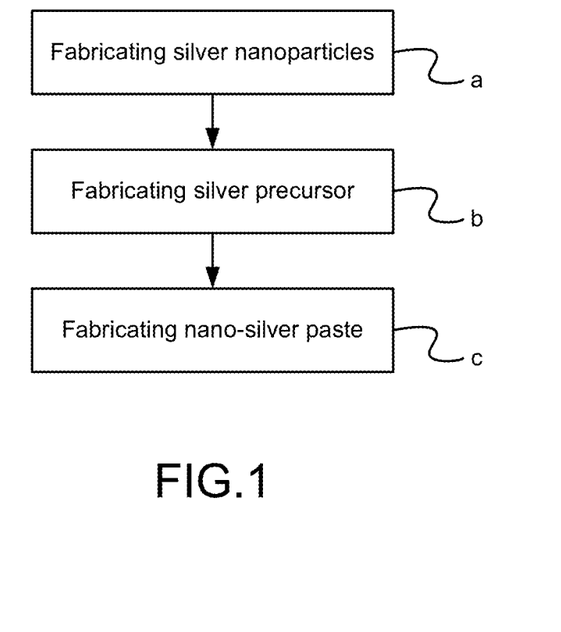
FIG. 1 is the flow view showing the preferred embodiment according to the present invention.

Please refer to FIG. 1, which is a flow view showing a preferred embodiment according to the present invention. As shown in the figure, the present invention is a method of fabricating a nano-silver paste, comprising the following steps:

(a) Fabricating silver nanoparticles: Silver nitrate is used as a silver ion source to reduce silver nanoparticles through a chemical reduction. An organic acid is used as a protective agent to protect a surface of the silver nanoparticles.

(b) Fabricating silver precursor: A 2-ethylhexanoic acid is dissolved in methyl alcohol to be added with a solution of sodium hydroxide for forming a mixed solution. Then, a solution of silver nitrate is added to the mixed solution for obtaining a silver precursor of organic metal.

(c) Fabricating nano-silver paste: The silver nanoparticles, the silver precursor and a solvent are mixed to obtain a nano-silver paste.

Thus, a novel method of fabricating a nano-silver paste is obtained.

On using the present invention, materials used in a preferred embodiment include: 99% 1-propylamine; ACS-grade toluene; 99.9% silver nitrate; 98% heptanol; 98% sodium borohydride; ACS-grade methyl alcohol; industrial-grade acetone; 96% sodium hydroxide; 99% 2-ethyl-hexanoic acid; and 99.5% dimethylacetamide (DMAc). The followings are states of use of the preferred embodiment:

[State-of-Use 1] Fabricating Silver Nanoparticles:

At first, 0.25 moles (mol) of 1-propylamine is dissolved in 500 milli-liters (ml) of toluene to be added in a 1000 ml three-neck flask. Then, 0.125 mol of silver nitrate is added with stirring until being dissolved, and the stirring continues. Then, 0.7233 mol of heptanoic acid is added to be stirred continuously for dissolving. Then, 0.0625 mol of sodium borohydride is added to form a black liquid for a continuous reaction for one hour. Then, a methanol/acetone mixture is used to precipitate silver nanoparticles with filtration and impurities remove. At last, the silver nanoparticles are dried and vacuumed for preservation.

[State-of-Use 2] Fabricating Silver Precursor:

At First, 58 milli-moles (mmol) of sodium hydroxide is dissolved in 50 ml of deionized water to form a solution of sodium hydroxide. Then, 58 mmol of 2-ethylhexanoic acid is dissolved in 50 ml of methanol to be added into the solution of sodium hydroxide to form a mixture. Then, 58 mmol of silver nitrate is dissolved in 50 ml of deionized water to form a solution of silver nitrate. Then, the solution of silver nitrate is slowly dropped into the mixture to obtain a white precipitate. Then, the white precipitate is filtered out to be washed twice with methanol. At last, the white precipitate is dried and vacuumed to obtain silver 2-ethyl-hexanoate, which is a silver precursor of organic metal.

[State-of-Use 3] Fabricating Nano-Silver Paste:

At first, 7.875 grams (g) of the silver nanoparticles, 2.625 g of the silver precursor (i.e., silver 2-ethylhexanoate) and 4.5 g of dimethylacetamide (heptanol, or α-terpineol, etc.) are put in the same beaker. Then, they are premixed by using a glass rod to form a premix. Finally, the premix is uniformly mixed with a three-roller mixing grinder to form a nano-silver paste.

The followings are an assessment of the silver nanoparticles; an assessment of the silver precursor; characteristics of the nano-silver paste and an analysis thereof; an electrical test; and a bonding-strength test for shearing:

[Assessment of Silver Nanoparticles]

Figure 2:
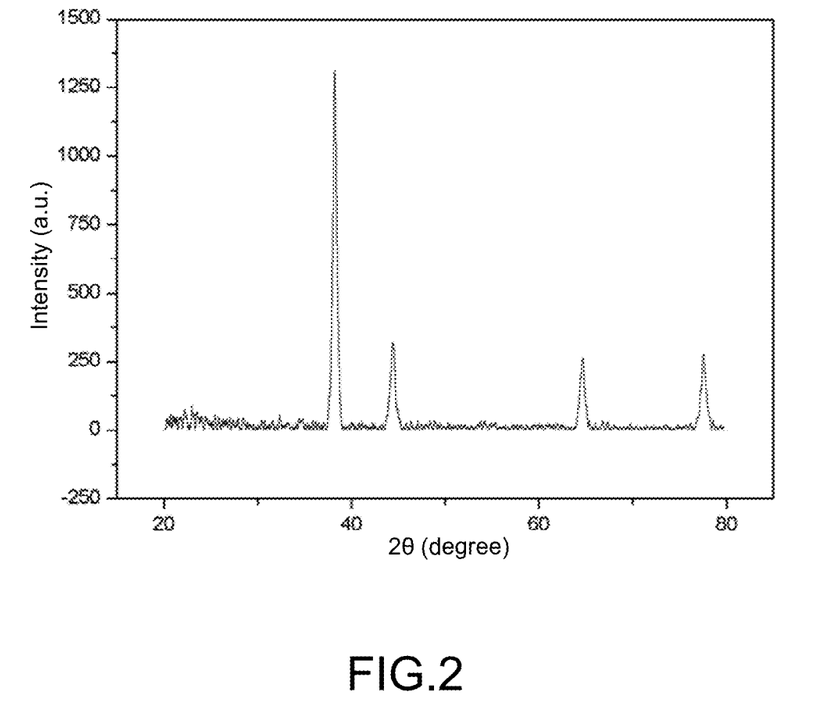
FIG. 2 is the XRD view showing the silver nanoparticles.
Figure 3:
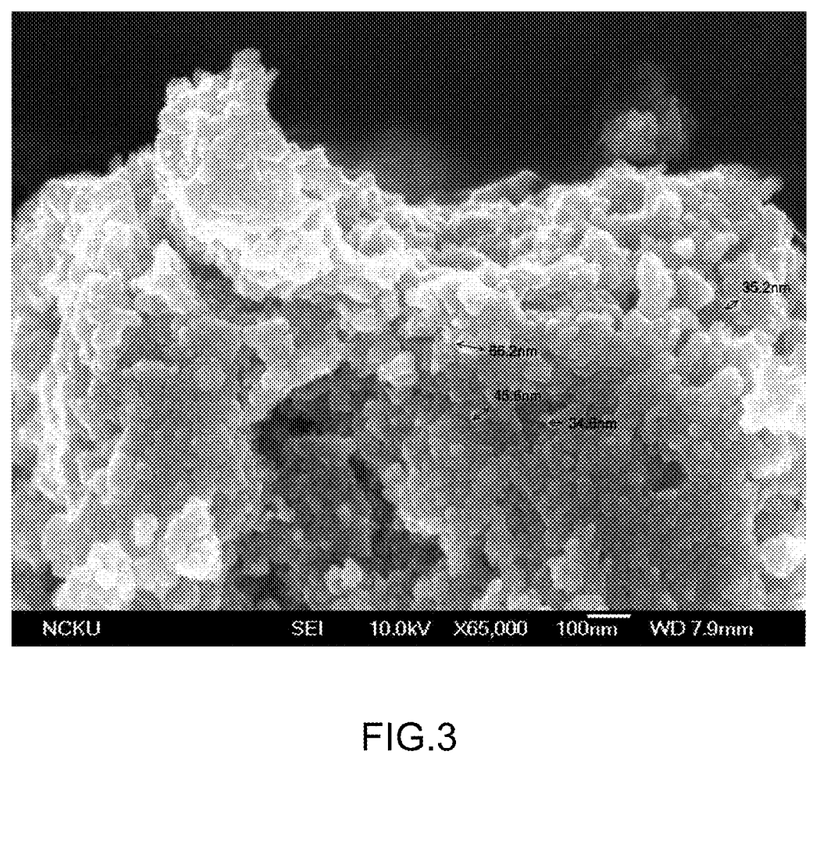
FIG. 3 is the SEM view showing the silver nanoparticles.
Figure 4:
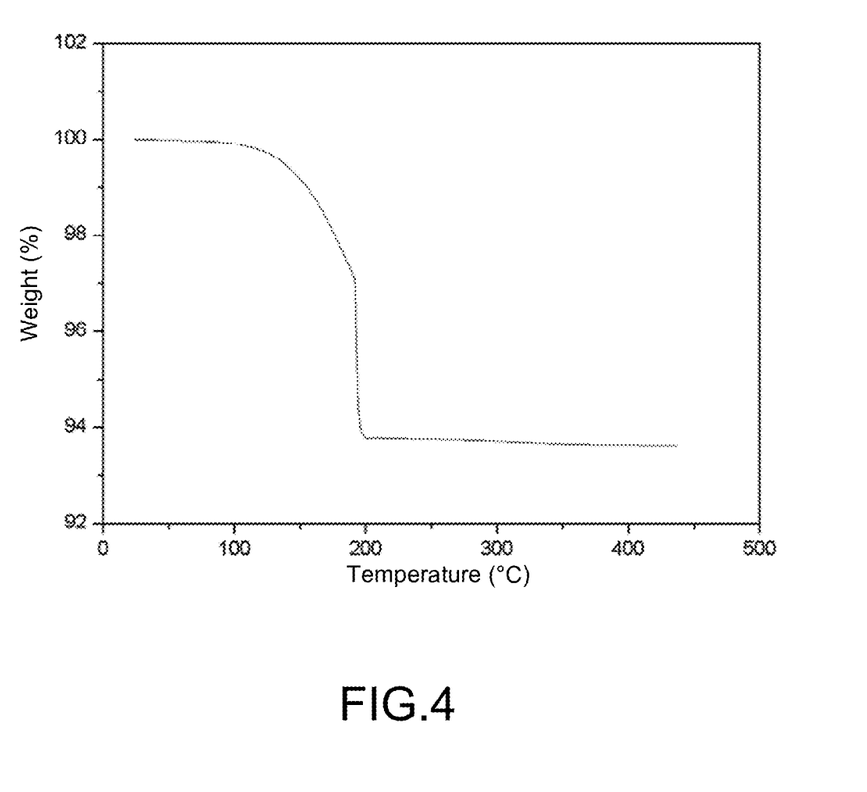
FIG. 4 is the TGA view showing the silver nanoparticles.

Please further refer to FIG. 2~FIG. 4, which are XRD, SEM and TGA views showing the silver nanoparticles; and a TGA view showing the silver precursor. As shown in the figures, the silver nano-particles is processed through an analysis of X-ray diffraction (XRD), where signals of Bragg angles will have high intensity in accordance with Bragg's law. Different compositions or different crystalline materials will have different interplanar spacings; and different spacings will cause different locations of the Bragg angles. Therefore, the XRD pictures can be compared with JCPDS database to acquire components and phases of materials. In FIG. 2, the comparison between the silver nanoparticles and a document of "Synthesis of Ag nanostructures by photo-chemical reduction using citrate-capped pt seeds. Journal of Nanomaterials, 2011. 2011, by Park, H.-H., et al." shows that the locations of the Bragg angles are corresponding to the angles revealed in the document. Hence, it is known that the present invention indeed reduces the metal silver from silver nitrate.

Characteristics of a nanomaterial are correlated to its size. A smaller silver nanoparticle has a lower melting point for being sintered at a lower temperature. In FIG. 3, an image of silver nanoparticles is shown through a JOEL 6700F Scanning Electron Microscope. It shows that the synthesized silver nanoparticles have sizes around 45 nano-meters (nm).

Nanoparticles have large surface areas and are easily reunited and joined together to form a block material with their characteristics lost. For solving this problem, in the process of chemical synthesis, a protective agent is added for surface passivation. Common protective agents include organic molecules containing thiol group, acid group and amine group. The protective agent used in the present invention for synthesis is heptanoic acid. In FIG. 4, a thermogravimetric analysis (TGA) of the silver nanoparticle is shown. A room temperature is raised to 450 celsius degrees (° C.) at a speed of 10° C. per minute (° C./min). It shows that heptanoic acid occupies a 6.4% weight of the whole and is completely cracked at 200° C.

The sintering temperature used in the present invention is sufficient to completely crack heptanol. As being held at such a high temperature, the silver nanoparticles will lose protecting groups and be sintered by the driving of the energy of the temperature. Thus, a bulk material having good intensity and conductivity is obtained.

[Assessment of Silver Precursor]

Figure 5:
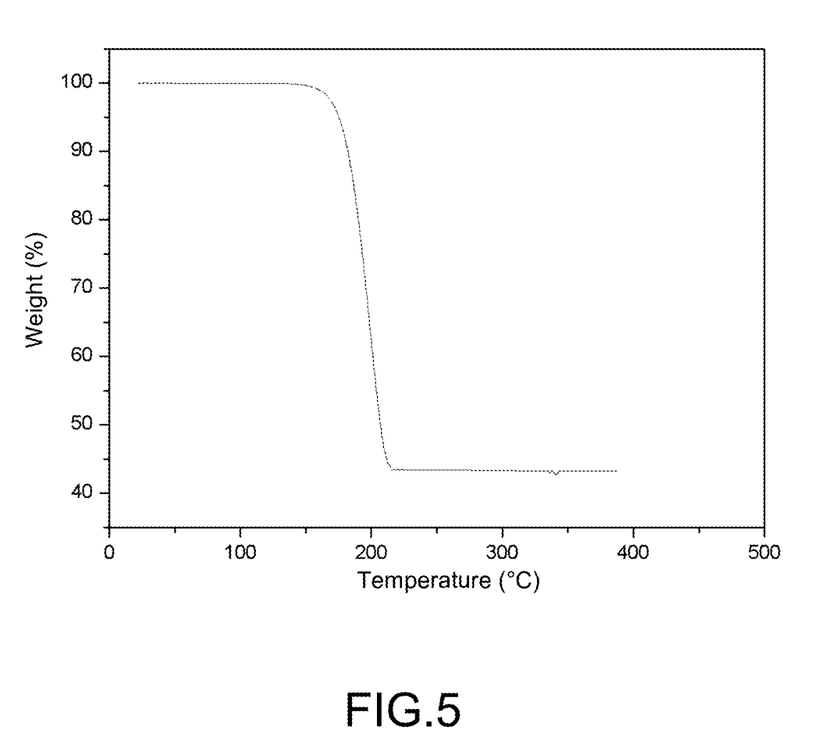
FIG. 5 is the TGA view showing the silver precursor.

Please further refer to FIG. 5, which is a TGA view showing the silver precursor. As shown in the figure, a synthesis method for the present invention uses 2-ethyl-hexanoate to synthesize a silver precursor, which is an organic metal. In FIG. 5, a TGA analysis of the silver precursor is shown, where a room temperature is raised to 400° C. at a speed of 10° C./min. In the figure, it is known that the silver precursor start cracking at about 160° C. and, after being completely cracked, a 56.7% thermogravimetric loss is formed. It is in full compliance with the ratio of 2-ethylhexyl acid group and silver in 2-ethylhexanoate.

When an appropriate amount of silver 2-ethylhexanoate is added, the in-situ reduction at a high temperature help to connect silver-sintered bulk. This makes the voids in the sintered bulk become padded to reduce resistance, increase density and help intensifying.

[Characteristics of Nano-Silver Paste and Analysis Thereof]

Figure 6A:
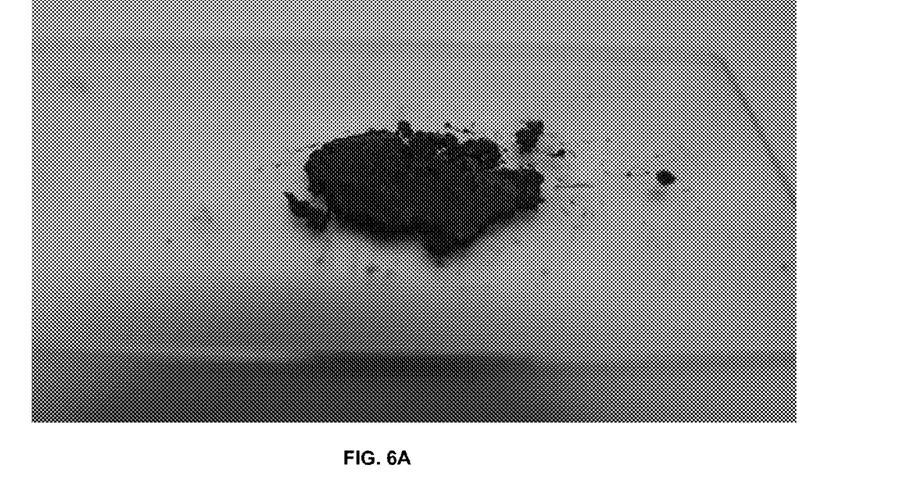
FIGS. 6A and 6B are views showing the appearances of the nano-silver paste before and after sintering.
Figure 6B:
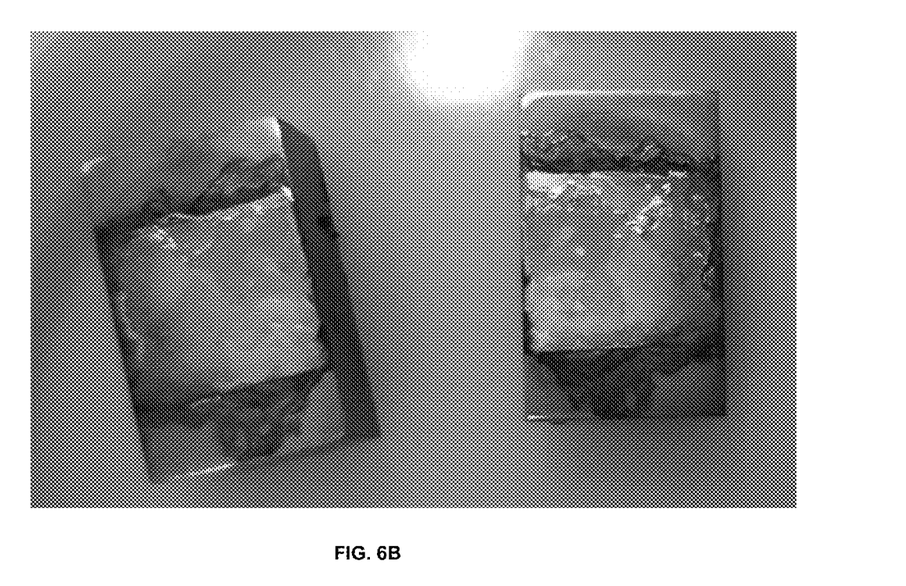
Figure 7:
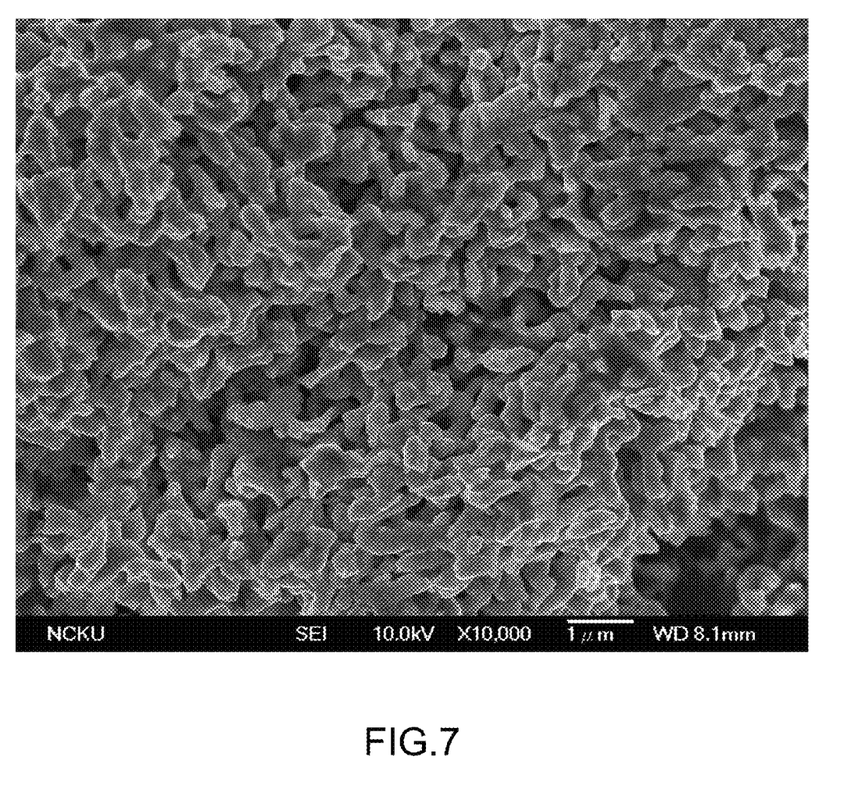
FIG. 7 is the SEM view showing the nano-silver paste obtained after sintering.
Figure 8:
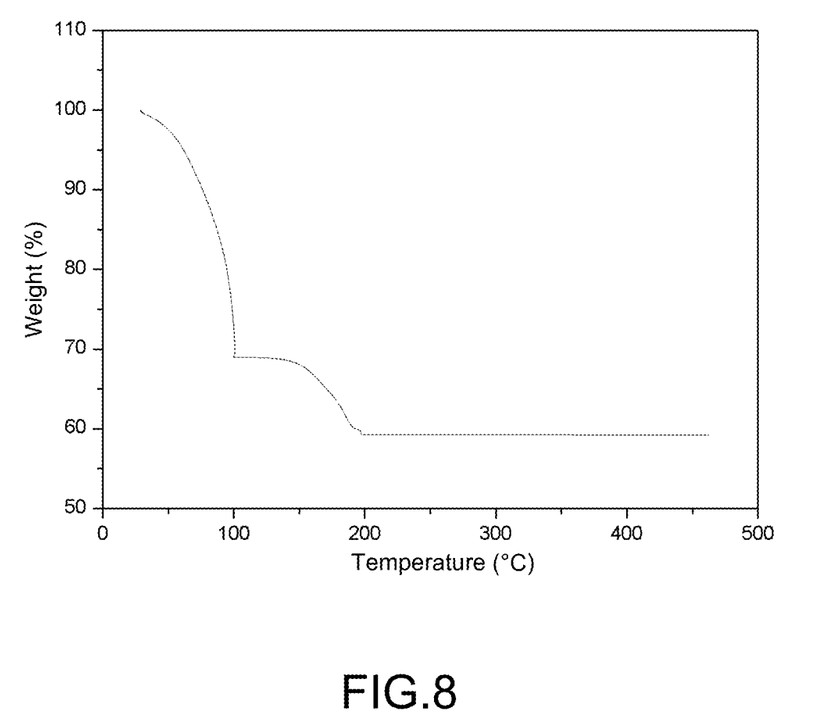
FIG. 8 is the TGA view showing the nano-silver paste obtained after sintering.

Please further refer to FIG. 6~FIG. 8, which are a view showing appearances of the nano-silver paste before and after sintering; and SEM and TGA views showing the nano-silver paste obtained after sintering. As shown in the figures, after being processed with a three-roller mixing grinder, the nano-silver paste (shown in FIG. 6A) is viscous with a dark blue color. After the nano-silver paste is pasted on a copper bulk to be hot-pressed and sintered, the nano-silver paste (shown in FIG. 6B) becomes bulk silver with a silver-white metallic luster. The image of the nano-silver paste formed after being sintered is shown in FIG. 7 through a scanning electron microscope. The original boundary of the silver nanoparticles does not exist anymore because of the sintering. What is seen is a continuous sintered body yet having pores.

The TGA analysis of the nano-silver paste is shown in FIG. 8. A room temperature is raised to 475° C. at a speed of 10° C./min. It shows that a first stage of the thermogravimetric loss is the volatilization of solvent, which accounts 30.7% of the overall weight and is completely volatilized before 100° C. A second stage of the thermogravimetric loss is the cracking process of the protective agent of the silver precursor of 2-ethylhexyl acid group and silver nanoparticles. Because the cracking temperatures for both materials are close, they can not be easily distinguished in the figure. This part of the thermogravimetric loss is about 10.2%. It follows that, after the nano-silver paste is hot-pressed and sintered at 250° C., the remaining silver has a 59.1% weight in the nano-silver paste.

[Electrical Test]

For processing an electrical test of the nano-silver paste, two tapes are sticked on a glass substrate to fix thickness of scratched slurry blade-coating. After the nano-silver paste is scratched on the glass substrate, the tapes are removed. Then, the glass substrate coated with the nano-silver paste is heated at 250° C. on a hot plate for 30 minutes (min). At last, a four-point probe is used to measure sheet resistance to be converted into resistivity.

When the resistance is small, the waste heat generated by the electric current can be reduced to save energy and solve heat-dissipation problem. In addition, the resistance is a factor of resistance-capacitance delay. The smaller is the resistance, the lower level is the signal delay; and the components also obtain more efficient performance. Therefore, the resistivity of the material which is used as a junction adhesive is extremely important.

The silver thick film obtained after being heated at 250° C. on the hot plate for 30 min has a thickness of 40 microns. The four-point probe is used to measure the sheet resistance and the converted resistivity obtained is $(3.09\pm0.61)\times10^{-5}$ $\Omega\cdot cm$, which is about 20 times to silver bulk. But this result is the data without applying pressure. If hot-pressing is done, the resistivity can be further reduced.

[Bonding-Strength Test for Shearing]

On processing a bonding-strength test for shearing for the nano-silver paste, two layers of tape is posted on two ends of a polished surface of a copper block to form an area of 30 square millimeters ($mm^2$) with deeply fixed trench. Then, after the nano-silver paste is scratched into the trench, the tapes are removed. The above steps are repeated to obtain two copper blocks coated with the nano-silver paste. The parts coated with the nano-silver paste are aligned to be hot-pressed with a heating rate of 10° C./min until 250° C. Then, the pressure is increased to 10 MPa and the temperature is maintained for 30 min to finish bonding. Then, a set of bonded copper blocks is obtained to be cooled down in the air. At last, the set of copper blocks obtained after being hot-pressed is processed through the bonding-strength test for shearing.

As being under attack, if the intensity of junction is not enough, the set of copper blocks will be fractured to cause disconnection of copper blocks and make it useless. Therefore, it is to say that the intensity of junction will affect the life of the product. The higher intensity and the better reliability will make the longer life of the product. The junction is usually made of copper. Hence, the substrate selected for the bonding-strength test for shearing in the present invention is made of copper; and a structure of copper/silver/copper is used to imitate the junction.

The intensity of junction is affected by two factors. The first factor is the intensity at the interface between the junction and the adhesive. The second factor is the adhesive itself. If the former is stronger than the latter, the fracture surface after shearing is located inside the adhesive. If the latter is stronger than the former, the fracture surface after shearing is located at the interface between the junction and the adhesive.

After the nano-silver paste is hot-pressed at 250° C. under 10 MPa for 30 min, the intensity of junction measured in the bonding-strength test for shearing is 36 MPa, which means that every square millimeter can withstand a weight of 3.6 kili-grams (kg) of force—a intensity far higher than those of commercial pastes. FIG. 6B shows a fracture surface located inside of the nano-silver paste, which proves an excellent bonding between the silver paste and copper after sintering. Moreover, a redox reaction is occurred between the silver precursor and copper atoms with the copper surface roughened by the reduction of silver ions and the oxidation of copper atoms, which phenomenon further helps to improve the bonding strength between copper and silver.

The above shows that the present invention uses an organic acid (enanthate) as a protective agent and silver nitrate as a silver ion source for reducing silver nanoparticles having surface protected by the organic acid (enanthate), where the particle size of silver nanoparticle is 45 nanometers (nm). In the other hand, a silver precursor (silver 2-ethylhexanoate) of organic metal is synthesized to fill residual pores left during sintering, which is done by the reducing and cracking happened at 200° C. After mixing the silver nanoparticles, the silver precursor (silver 2-ethylhexanoate) and the solvent (dimethylacetamide, heptanol or α-terpineol), the nano-silver paste is formed. Through being hot-pressed at 250° C., organic components inside the nano-silver paste are well cracked with silver left. Therein, after being heated at 250° C. on a hot plate for 30 min, the nano-silver paste obtains a resistance of $(3.09\pm0.61)\times10^{-5}$ $\Omega\cdot cm$. By using copper substrates, a bonding of copper-to-copper is done through hot-pressing for 30 min with a pressure of 10 MPa while being heated at 250° C. The sample is processed through the bonding-strength test for shearing to ensure a copper/silver/copper structure having a bonding strength of 36 MPa. Nevertheless, after being hot-pressed, the interface of copper/silver obtains intensity even higher than the nano-silver paste itself. Thus, the present invention proves that, by adding the silver precursor, the intensity of junction of the nano-silver paste is significantly improved to obtain a high-intensity nano-silver paste.

To sum up, the present invention is a method of fabricating a nano-silver paste, where silver nanoparticles, a silver precursor and a solvent of dimethylacetamide (heptanol, or α-terpineol) are mixed to fabricate a high-intensity nano-silver paste to be used as an adhesive for bonding copper; by pasting the paste on polished copper blocks, hot-pressing and shearing tests for a bonding of copper-to-copper are done at 250° C. with a pressure of 10 MPa and a shearing intensity of 36 MPa is achieved; after being heated at 250° C. on a hot plate for 30 min, the nano-silver paste obtains a resistance of $(3.09\pm0.61)\times10^{-5}$ $\Omega\cdot cm$; and, thus, it proves that, by adding the silver precursor, the junction intensity of the nano-silver paste is significantly improved.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method of fabricating a nano-silver paste, comprising steps of:
    (a) fabricating silver nanoparticles using silver nitrate as a silver ion source to produce said silver nanoparticles through a chemical reduction and using a protective agent to protect a surface of said silver nanoparticles;
    (b) dissolving 2-ethylhexanoic acid in methyl alcohol and adding a solution of sodium hydroxide to obtain a mixed solution and adding a solution of silver nitrate to said mixed solution to obtain a silver precursor of organic metal; and
    (c) mixing said silver nanoparticles, said silver precursor and a solvent to obtain a nano-silver paste, wherein said paste composition consists of a silver nanoparticle component having a particle size of 45 nm±20%.

2. The method according to claim 1, wherein said protective agent is heptanoic acid.

3. The method according to claim 1, wherein said protective agent has a weight occupying 6.4 percents (%)±20% of a weight of a whole there-containing said silver nanoparticles.

4. The method according to claim 1, wherein said silver precursor is silver 2-ethylhexanoate.

5. The method according to claim 1, wherein said solvent is selected from the group consisting of dimethylacetamide (DMAc), heptanol and α-terpineol.

6. The method according to claim 1, wherein said silver nanoparticles, said silver precursor and said solvent are mixed at a ratio of 3:1:1.73.

7. The method according to claim 1, further comprising hot-pressing the nano-silver paste at a temperature of 200~250° C., such that said silver precursor in said nano-silver paste is cracked and reduces to fill pores left during sintering.

* * * * *